United States Patent
Northup

(10) Patent No.: US 9,576,129 B2
(45) Date of Patent: Feb. 21, 2017

(54) DEFENSIVE TECHNIQUES TO INCREASE COMPUTER SECURITY

(71) Applicant: Google Inc., Mountain View, CA (US)

(72) Inventor: Eric R. Northup, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/839,594

(22) Filed: Aug. 28, 2015

(65) Prior Publication Data

US 2015/0371041 A1 Dec. 24, 2015

Related U.S. Application Data

(60) Continuation of application No. 14/473,085, filed on Aug. 29, 2014, which is a division of application No.
(Continued)

(51) Int. Cl.
| | | |
|---|---|---|
| G06F 12/14 | (2006.01) |
| G06F 21/56 | (2013.01) |
| G06F 21/57 | (2013.01) |
| G06F 21/74 | (2013.01) |
| G06F 21/52 | (2013.01) |
| G06F 21/71 | (2013.01) |
| G06F 9/54  | (2006.01) |
| G06F 21/45 | (2013.01) |

(52) U.S. Cl.
CPC .............. *G06F 21/56* (2013.01); *G06F 9/545* (2013.01); *G06F 21/45* (2013.01); *G06F 21/52* (2013.01); *G06F 21/57* (2013.01); *G06F 21/71* (2013.01); *G06F 21/74* (2013.01)

(58) Field of Classification Search
CPC .......... G06F 21/57; G06F 21/74; G06F 21/72; G06F 21/50; G06F 2212/206; G06F 12/10; G06F 12/109; G06F 12/1009
USPC ........................................................ 726/24
See application file for complete search history.

(56) References Cited

U.S. PATENT DOCUMENTS

| | | |
|---|---|---|
| 7,571,298 B2 | 8/2009 | Khosravi et al. |
| 7,685,638 B1 | 3/2010 | Buches |

(Continued)

FOREIGN PATENT DOCUMENTS

| | | |
|---|---|---|
| CN | 1918556 | 2/2007 |
| JP | 2004-531819 | 10/2004 |

(Continued)

OTHER PUBLICATIONS (2007). Xu et. al. Towards a VMM-based Usage Control Framework for OS Kernel Integrity Protection. SACMAT '07 Proceedings of the 12th ACM symposium on Access control models and technologies pp. 71-80. ACM.*

(Continued)

*Primary Examiner* — Brian Shaw
(74) *Attorney, Agent, or Firm* — Fish & Richardson P.C.

(57) ABSTRACT

Among other disclosed subject matter, a computer-implemented method includes changing access permission level associated with a descriptor table responsive to request to update the descriptor table. In some implementation, before receiving the request to update, the descriptor table is maintained in a read-only state; and changing the access permission level comprises: allowing write access to the descriptor table responsive to determining that the update request is authorized.

18 Claims, 3 Drawing Sheets

Related U.S. Application Data

13/277,063, filed on Oct. 19, 2011, now Pat. No. 8,826,440.

(56) References Cited

U.S. PATENT DOCUMENTS

| | | |
|---|---|---|
| 2004/0210737 A1 | 10/2004 | Ness |
| 2004/0268084 A1* | 12/2004 | Longerbeam ......... G06F 12/145 711/206 |
| 2005/0177649 A1 | 8/2005 | Geon et al. |
| 2007/0011430 A1 | 1/2007 | Khosravi et al. |
| 2007/0067590 A1 | 3/2007 | Savagaonkar et al. |
| 2009/0037936 A1 | 2/2009 | Serebrin |
| 2010/0031360 A1 | 2/2010 | Seshadri et al. |

FOREIGN PATENT DOCUMENTS

| | | |
|---|---|---|
| JP | 2005-056429 | 3/2005 |
| JP | 2005-122711 | 5/2005 |
| JP | 2007-004661 | 1/2007 |
| JP | 2011-090612 | 5/2011 |

OTHER PUBLICATIONS

International Search Report and Written Opinion in International Application No. PCT/US2012/060412, mailed Apr. 17, 2013, 15 pages.
Bovet and Cesati, "Understanding the Linux Kernel, 3rd Edition," O'Reilly Publishers, Nov. 2005, 942 pages.
Office Action issued in Japanese Application No. 2014-537150 on Apr. 5, 2016, 4 pages. (with English translation).
Office Action issued in Chinese Application No. 201280061783.3 on Mar. 21, 2016, 10 pages. (with English abstract).

* cited by examiner

DEFENSIVE TECHNIQUES TO INCREASE COMPUTER SECURITY

CROSS-REFERENCE TO RELATED APPLICATIONS

This application is a continuation of U.S. patent application Ser. No. 14/473,085, filed on Aug. 29, 2014, entitled "Defensive Techniques to Increase Computer Security," which is a divisional of U.S. patent application Ser. No. 13/277,063, now U.S. Pat. No. 8,826,440, filed on Oct. 19, 2011, entitled "Defensive Techniques to Increase Computer Security".

All above-identified patents and patent applications are hereby incorporated by reference in their entireties.

TECHNICAL FIELD

This specification relates computer security.

BACKGROUND

A computer system can be compromised by hostile software applications or processes (e.g., malware, viruses, etc.). A hostile software application can cause an operating system kernel to write data to memory locations specified by the hostile software application. For example, the hostile software application can exploit defects and/or vulnerabilities associated with an operating system and cause the operating system kernel to modify the instructions associated with the kernel (e.g., insert a backdoor that allows a user or other software to circumvent security measures or that grants a user or software improper access). As another example, the hostile software application can cause the operating system kernel to modify data stored in various data structures or tables used by the Central Processing Unit (CPU) or operating system (e.g., an interrupt descriptor table, global descriptor table, etc.). In addition, the hostile software application can exploit the defects and/or vulnerabilities associated with an operating system to determine the location of a resource associated with the CPU or operating system (e.g., an interrupt descriptor table or a global descriptor table) using commands associated with the CPU. For example, the hostile software application can use the SIDT instruction to cause the CPU to provide the address of the interrupt descriptor table.

SUMMARY

This specification describes technologies relating to defensive techniques for improving computer security. The system can initialize a descriptor table (e.g., interrupt descriptor table or a global descriptor table) and map the descriptor table to a different memory locations. One mapping of the descriptor table can be associated with read-write permissions and a second mapping of the descriptor table can be associated with read-only permissions. The system can provide the address of the read-only descriptor table (e.g., the second mapping) to the CPU. When the CPU receives a command to return the value of the descriptor table, the CPU can provide the address of the read-only descriptor table. When the operating system kernel receives a valid instruction to update the descriptor table (e.g., an instruction from a trusted process or from the operating system as opposed to an instruction from a hostile software application), the operating system kernel can access the descriptor table and update the values of the descriptor table.

In general, one innovative aspect of the subject matter described in this specification can be embodied in methods that include the actions of: initializing a first descriptor table and a second mapping of the descriptor table, wherein the first mapping of the descriptor table is associated with a first permission level and wherein the second mapping of the descriptor table is associated with a second permission level that is different from the first permission level and wherein the first descriptor table and the second descriptor table are associated with a hardware processor and initialized by an operating system kernel; in response to a descriptor table address request, providing a memory address associated with the first descriptor table, wherein the descriptor table address request is provided by a software process; and in response to an update request, updating the second descriptor table.

Another innovative aspect of the subject matter described in this specification can be embodied in methods that include the actions of: initializing a descriptor table, wherein the descriptor table is initialized by an operating system kernel and is associated with a hardware processor; changing a permission level associated with the descriptor table to a first permission level; and in response to an update request, changing the permission level associated with the descriptor table to a second permission level, wherein the second permission level is greater than the first permission level; updating the descriptor table while the descriptor table is associated with the second permission level, wherein the updating is based on the update request; and after updating the descriptor table, changing the permission level associated with the descriptor table to the first permission level, wherein the operating system kernel changes the permission level associated with the descriptor table.

Particular embodiments of the subject matter described in this specification can be implemented so as to realize one or more of the following advantages. For example, network and computer security can be increased by preventing a hostile software application or malware from accessing or modifying data structures used by the CPU and/or OS Kernel (e.g., interrupt descriptor tables and global descriptor tables). In addition, the operating system can be more easily debugged because unintended overwriting of a descriptor table can be reduced or prevented.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
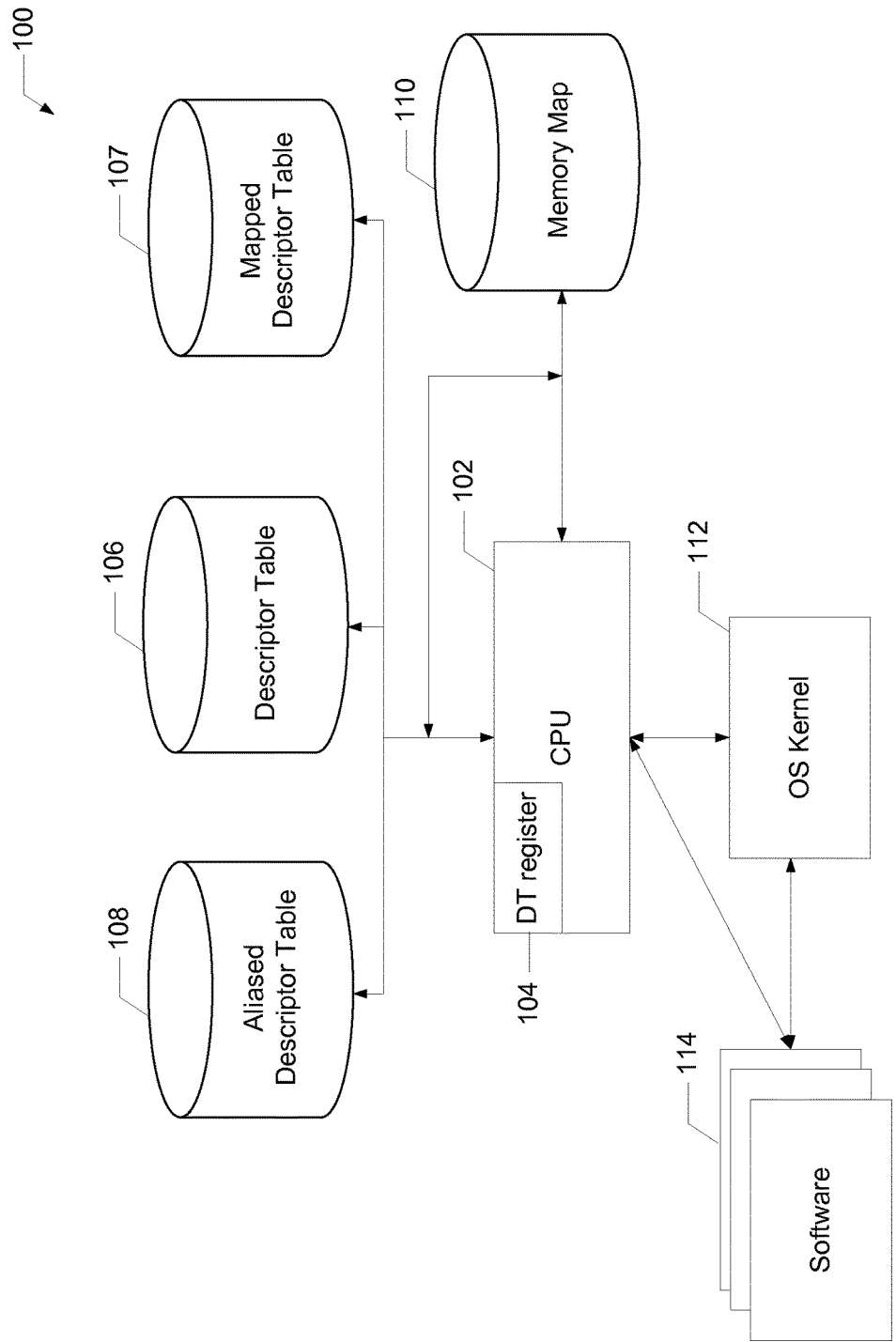
FIG. 1 illustrates an example system to improve computer security.

FIG. 1 illustrates an example system 100 for improving computer security. The system 100 includes a CPU 102, a descriptor table register 104, a descriptor table 106, a first mapping of the descriptor table 107, an aliased descriptor table 108, a memory map 110, an operating system kernel 112 and software processes 114. The CPU 102 can be various types of computer processors. For example, the CPU 102 can be an x86 processor, an x86 compatible processor or a 64 bit descendant of the x86 processor (e.g., Intel Core 2 or AMD Opteron). Other CPUs can be used.

The CPU 102 can include a descriptor table register 104 ("DT register") that stores the memory address of an associated descriptor table 106. For example, the CPU 102 can include an interrupt descriptor table register that stores the memory address of an interrupt descriptor table. Although FIG. 1 illustrates a single DT register 104, the CPU 102 can include multiple DT registers 104 that correspond to various descriptor tables 106. For example, in addition to the interrupt descriptor table register, the CPU 102 can include a global descriptor table register that stores the memory address associated with a global descriptor table. The DT register 104 can store a physical memory address or a virtual memory address.

The value stored in the DT register 104 can be programmed by the operating system kernel 112. For example, during the initialization of the system 100 (e.g., at boot-time), the operating system kernel 112 can store the memory address associated with the aliased descriptor table 108 (e.g., a virtual memory address). In some implementations, the value stored in the DT register 104 can be programmed at times other than initialization.

The memory map 110 can be a memory management module associated with the CPU 102 that describes how memory is organized (e.g., a virtual memory map). For example, the memory map 110 can include information that describes the memory size, areas of memory that are reserved for operating system use and/or areas of memory that can be used or accessed by software processes 114. In addition, the memory map 110 can be used to specify whether a memory address is associated with a read-only permission or a read-write permission. For example, the operating system kernel 112 can modify the memory map 110 to change the permissions associated with the descriptor table 106 or the aliased descriptor table 108. In addition, the memory map 110 can be used by the CPU 102 or a memory manager associated with the CPU 102 to interpret a logical/virtual memory address to a physical memory address.

The descriptor table 106 can include memory addresses associated with various software routines or data structures, memory segment descriptors, mechanisms for changing privilege levels associated with the CPU (e.g., "call gates") and other data, for instance. For example, the descriptor table 106 can be an interrupt descriptor table that can be used to implement an interrupt vector table. In some implementations, the interrupt descriptor table includes memory addresses associated with interrupt handlers, which can be software processes or routines that process interrupts (e.g., hardware interrupts, software interrupts and/or processor exceptions (collectively referred to as "interrupts")) as they are triggered. For example, the interrupt descriptor table can store a memory address associated with an interrupt handler ("T0_Int_Handler") in a location within the table that corresponds with a timer interrupt. When the timer interrupt is triggered, the operating system can access the interrupt descriptor table and determine that T0_Int_Handler should be executed in response to the timer interrupt.

Using the memory map 110, the descriptor table 106 can be associated with various permission levels. For example, the descriptor table 106 can have a read-only permission that prevents the descriptor table 106 and the values stored in the descriptor table 106 from being modified. In addition, the descriptor table 106 can have a read-write permission that allows the descriptor table 106 and the values stored in the descriptor table 106 to be modified. The permission level associated with the descriptor table 106 can be modified by the operating system kernel 112. For example, the operating system kernel 112 can use the memory map 110 to change the permission of the descriptor table 106 from read-write to be read-only.

The descriptor table 106 can be located at various physical memory addresses. For example, the descriptor table 106 can be created by the operating system kernel 112 or CPU 102 at random memory addresses. In addition, the descriptor table 106 can be created at a fixed memory address. In addition, the descriptor table 106 can be mapped from a physical memory location to a virtual memory location by the memory map 110 (e.g., the mapped descriptor table 107). The mapped descriptor table 107 can point back to the descriptor table 106 and the values included in the mapped descriptor table 107 can reflect the values included in the descriptor table 106. For example, if a value included in the descriptor table 106 is changed, the mapped descriptor table 107 is also updated to reflect the changed value.

The descriptor table 106 can be mapped to a second address using the memory map 110 (e.g., the aliased descriptor table 108). For example, the descriptor table 106 can be mapped to a second virtual address that points to the physical memory address associated with the descriptor table 106. Similar to the mapped descriptor table 107, the values included in the aliased descriptor table 108 can reflect the values included in the descriptor table 106 (and the mapped descriptor table 107).

The descriptor table 106, the mapped descriptor table 107 and the aliased descriptor table 108 can be associated with different permissions. For example, the descriptor table 106 and the mapped descriptor table 107 can be associated with read-write permission and the aliased descriptor table 108 can be associated with a read-only permission. In addition, the permission level associated with the descriptor table 106, the mapped descriptor table 107 and the aliased descriptor table 108 can be modified by the operating system kernel 112. For example, the operating system kernel 112 can set the permission level associated with the aliased descriptor table 108 to be read-only and can set the permission level associated with the descriptor table 106 to be read-write. The aliased descriptor table 108 can be accessed by the CPU and/or the operating system kernel 112. In some implementations, the system 100 does not include mapped descriptor table 107 and/or the aliased descriptor table 108.

The CPU 102 can include instructions that cause it to provide the memory address of the descriptor table 106. For example, the CPU 102 can include an instruction that causes it to return the value stored in the DT register 104 (e.g., a SDT instruction). In some implementations, the SDT instruction can be a Store Interrupt Descriptor Table instruction (SIDT) that returns the memory address associated with the interrupt descriptor table or a Store Global Descriptor Table instruction (SGDT) that returns the memory address associated with the global descriptor table. The instructions can be used by the operating system kernel 112. A software application or process 114 can exploit a defect or vulnerability in the operating system and cause the operating system kernel 112 to issue the SDT instruction.

The operating system kernel 112 can be any appropriate type of operating system kernel. The operating system kernel 112 can manage the CPU's resources and/or other hardware resources associated with system 100. The operating system kernel 112 can interact with software processes 114 executed on the system 100. For example, the operating system kernel 112 can receive instructions from the software processes 114 and interact with the CPU 102 and/or hardware resources associated with the system 100 on behalf of the software processes 114 (e.g., exchange data with data port or a peripheral device).

The software processes 114 can be one or more software applications or processes that interact with the operating system kernel 112. In some implementations, a software process 114 can cause the CPU 102 to provide the memory addresses associated with the descriptor table 106. For example, the software process 114 use the SIDT instruction to cause the CPU 102 to return the value store in the DT register 104 associated with the interrupt descriptor table.

Figure 2:
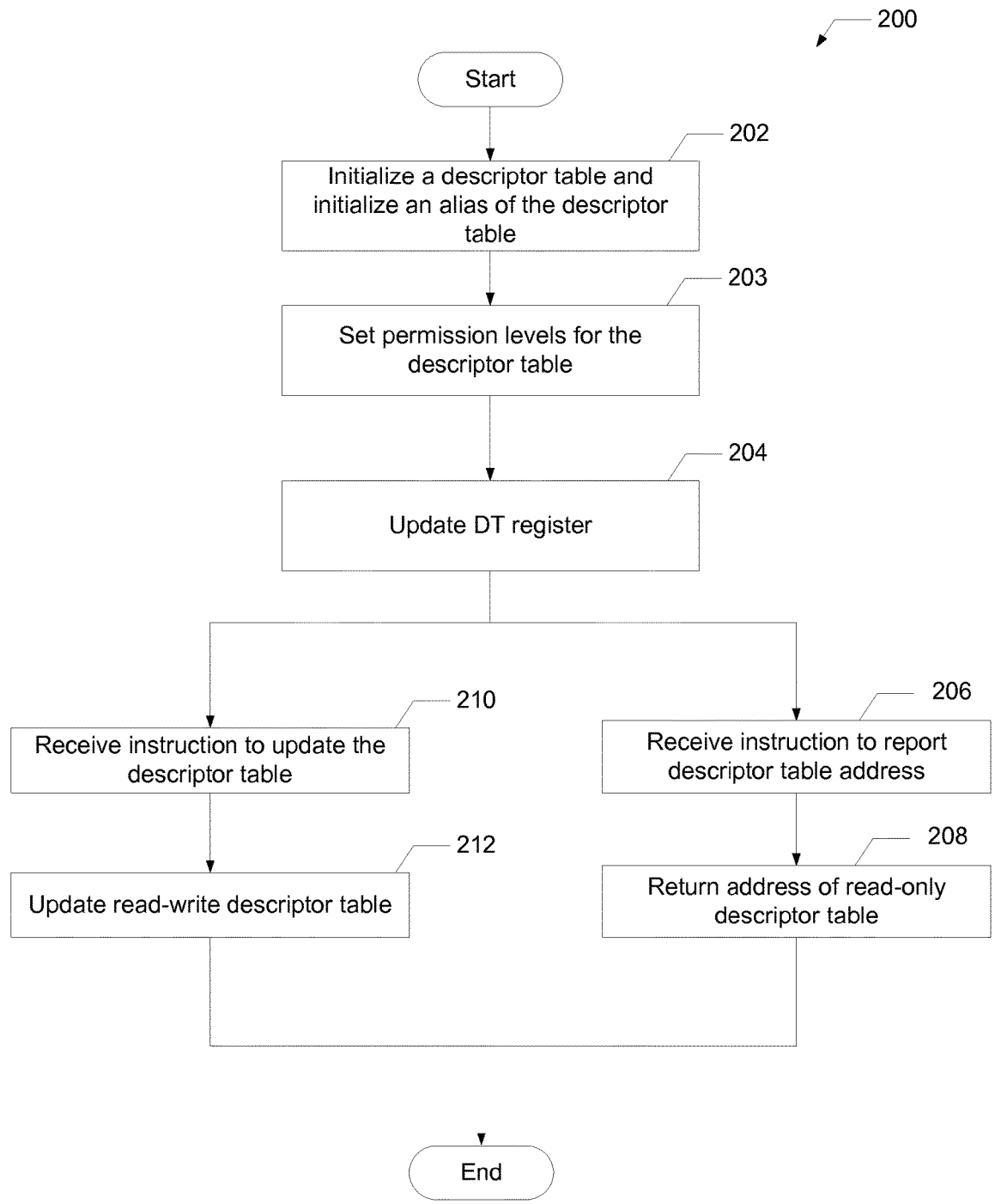
FIG. 2 is a flowchart of an example process for improving computer security.

FIG. 2 is a flowchart of an example process 200 for improving computer security. The process 200 begins by creating and initializing a descriptor table (at 202). For example, when the CPU 102 is initialized (e.g., at boot-time), the operating system kernel 112 or firmware associated with the operating system kernel 112 can create and initialize the descriptor table 106. The firmware or operating system kernel 112 updates the values of the descriptor table 106 to include memory locations associated with software routines that are executed when an interrupt is triggered (e.g., "interrupt handlers"). The operating system kernel 112 can map the descriptor table 106 to a first virtual memory address (e.g., the mapped descriptor table 107). The operating system kernel 112 can create a second mapping of the initialized descriptor table 106 (e.g., the aliased descriptor table 108). The operating system kernel 112 can locate the mapped descriptor table 107 and the aliased descriptor table 108 at different virtual memory addresses. For example, the operating system kernel can use the memory map 110 to locate the mapped descriptor table 107 at a first virtual memory address and map the aliased descriptor table 108 at a second virtual memory address that is different from the first virtual memory address. In some implementations, the operating system kernel 112 creates the mapped descriptor table 107 and the aliased descriptor table 108 at a random memory location. In some implementations, the mapped descriptor table 107 is not included and is not used.

The permission levels associated with the descriptor table are updated (at 203). For example, the operating system kernel 112 can set the permission level associated with the aliased descriptor table 108 to be read-only and the permission level associated with descriptor table 106 and the mapped descriptor table 107 to be read-write. In some implementations, the operating system kernel 112 sets the permission levels associated with the descriptor table 106, the mapped descriptor table 107 and the aliased descriptor table 108 using the memory map 110.

The operating system kernel updates the DT register (at 204). For example, the operating system kernel 112 can update the DT register 104 to store the memory address associated with the aliased descriptor table 108 (e.g., the virtual memory address associated with the aliased descriptor table 108).

The process 200 can continue by receiving an instruction to return the memory address associated with the descriptor table (at 206). For example, the CPU 102 can receive a SDT instruction from the operating system kernel 112 or a software application 114. In some implementations, the SDT instruction is an SIDT instruction or a SGDT instruction.

In response to the instruction, the CPU returns the memory address stored in the DT register (at 208). For example, in response to the SDT instruction, the CPU 102 can provide the memory address associated with the aliased descriptor table 108, which was stored in the DT register 104 at 204. Although the memory address of the aliased descriptor table 108 is returned by the CPU 102, a hostile software application 114 cannot exploit this information because the aliased descriptor table 108 is associated with read-only permissions. If a hostile software application 114 attempts to use the memory address of the aliased descriptor table 108 returned at 208 to write data into the descriptor table 106, the operating system kernel 112 or the memory map 110 generates an error (e.g., a permission fault) and prevents the hostile software application from writing data into the descriptor table 106. Therefore, a hostile software application cannot modify the values or contents of the descriptor table 106.

Alternatively, the process 200 can receive an instruction to update the data stored in the descriptor table (at 210). For example, the operating system kernel 112 can receive an instruction that the descriptor table 106 should be updated. In some implementations, the operating system kernel 112 can receive the instruction to update the descriptor table from an operating system function (e.g., a hardware manager).

In response to the instruction, the operating system kernel can update the descriptor table (at 212). For example, the operating system kernel 112 can access the mapped descriptor table 107, which is associated with read-write permissions, and update a value associated with a particular entry in the mapped descriptor table 107. Because the mapped descriptor table 107 is a mapping of the descriptor table 106, the values included in the descriptor table 106 and the aliased descriptor table 108 are updated. In some implementations, the operating system kernel 112 accesses the descriptor table 106 and updates the values in the descriptor table 106.

Figure 3:
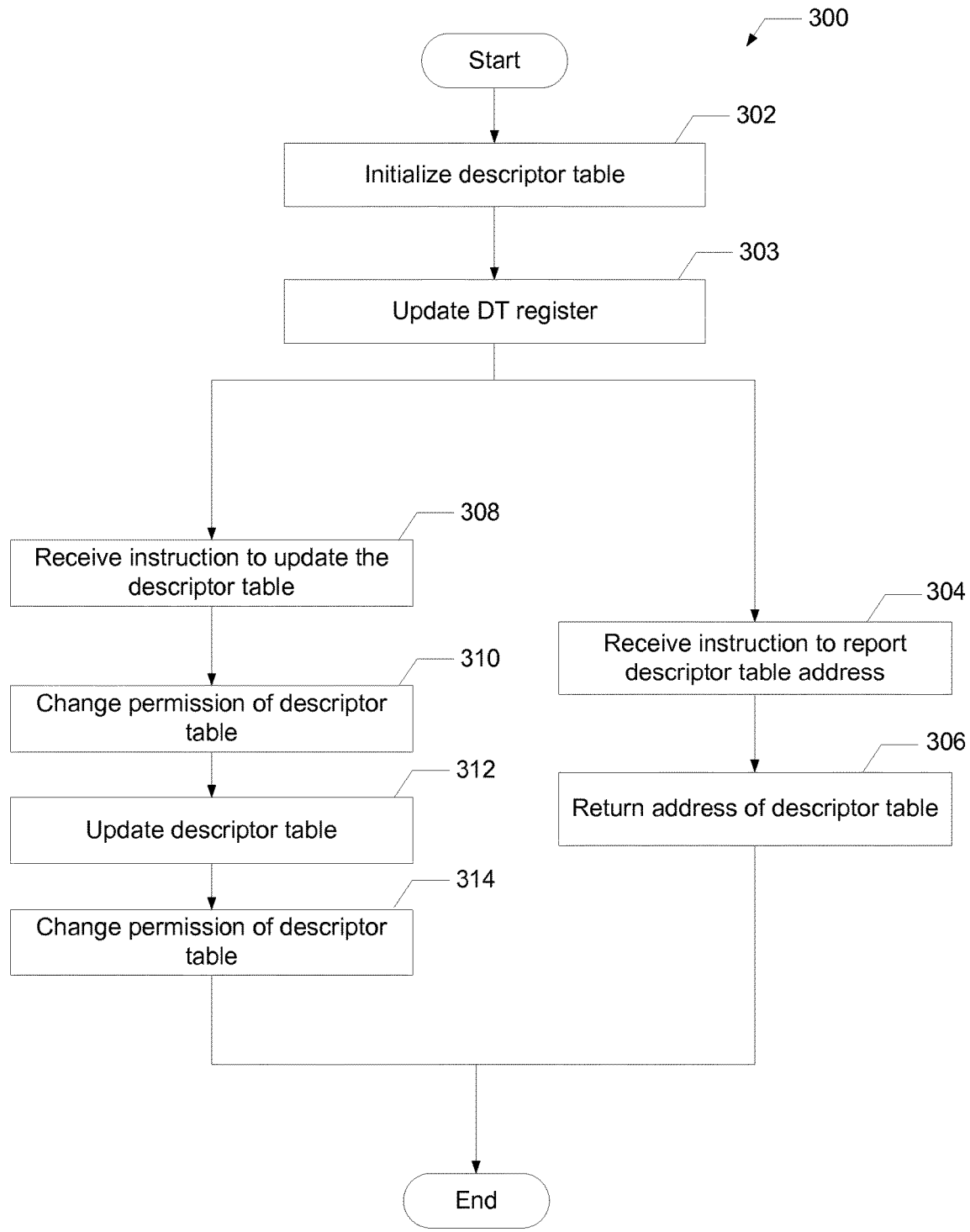
FIG. 3 is a flowchart of an example process for improving computer security.

FIG. 3 is a flowchart of an example process 300 for improving computer security. The process 300 begins by initializing the descriptor table (at 302). For example, the operating system kernel 112 can create a descriptor table 106 (e.g., an interrupt descriptor table or a global descriptor table) and initialize the descriptor table 106 to include the appropriate data values (e.g., memory addresses associated with interrupt handlers or characteristics associated with various memory segments). In some implementations, the operating system kernel 112 initializes the descriptor table 106 at boot-time. The operating system kernel 112 can change the permissions associated with the descriptor table 106 to be read-only.

The operating system kernel 112 can update the DT register (at 303). For example, the operating system kernel 112 can store the memory address associated with the descriptor table 106 in the DT register 104.

The process 300 can continue by receiving an instruction to provide the memory address associated with the descriptor table (at 304). For example, the CPU 102 can receive a SDT instruction from the operating system kernel 112 or a software application 114. In some implementations, the SDT instruction is an SIDT instruction or a SGDT instruction. In response to the instruction, the CPU returns the memory address stored in the DT register (e.g., the memory address of the descriptor table 106) (at 306). Although the memory address of the descriptor table 106 is returned by the CPU 102, a hostile software application 114 cannot exploit this information because the descriptor table 106 is associated with read-only permissions. If a hostile software application 114 attempts to write data into the descriptor table 106, the operating system kernel 112 or the memory map 110 generates a permission fault. Therefore, a hostile software application cannot modify the values or contents of the descriptor table 106.

Alternatively, the process 300 can receive an instruction to update the data stored in the descriptor table (at 308). For example, the operating system kernel 112 can receive an instruction that the descriptor table 106 should be updated. In some implementations, the operating system kernel 112 can receive the instruction from an operating system function (e.g., a hardware manager).

In response to the instruction, the operating system kernel can change the permission level associated with the descriptor table (at 310). For example, the operating system kernel 112 can change the permission level associated with the descriptor table 106 from read-only to be read-write.

After the permission level associated with the descriptor table has been updated, the descriptor table can be updated (at 312). For example, the operating system kernel 112 can update a value associated with a particular entry in the descriptor table 112. After the descriptor table is updated, the permission level associated with the descriptor table can be changed (at 314). For example, after the descriptor table 106 has been updated to include a new value, the operating system kernel can change the permission level associated with the descriptor table to be read-only.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   setting, by an operating system kernel, an access permission level of a descriptor table to a first permission level;
   receiving, from a function by the operating system kernel, a request to update the descriptor table;
   in response to receiving the request to update the descriptor table, determining, by the operating system kernel, whether the function is an operating system function or a function for another application;
   determining, by the operating system kernel, that the function is an operating system function, wherein the operating system kernel is different from the operating system function;
   in response to determining that the function is an operating system function, changing, by the operating system kernel, the access permission level of the descriptor table to a second permission level different than the first permission level;
   updating, by the operating system kernel, the descriptor table while the access permission level of the descriptor table is the second permission level; and
   after updating the descriptor table, changing, by the operating system kernel, the access permission level of the descriptor table to the first permission level.

2. The method of claim 1, further comprising:
   before receiving the request to update the descriptor table, maintaining the descriptor table in a read-only state in the first permission level.

3. The method of claim 1, further comprising:
   initializing the descriptor table using an operating system kernel.

4. The method of claim 1, wherein setting the access permission level of the descriptor table to the first permission level comprises setting an access permission level of an interrupt descriptor table to the first permission level.

5. The method of claim 1, wherein setting the access permission level of the descriptor table to the first permission level comprises setting an access permission level of a global descriptor table to the first permission level.

6. The method of claim 1, wherein determining that the function is an operating system function comprises determining that the function is a hardware manager of the operating system.

7. A computing system comprising:
   one or more computers; and one or more storage units storing instructions that when executed by the one or more computers cause the one or more computers to perform operations comprising:

setting, by an operating system kernel for one of the computers, an access permission level of a descriptor table to a first permission level;

receiving, from a function by the operating system kernel, a request to update the descriptor table;

in response to receiving the request to update the descriptor table, determining, by the operating system kernel, whether the function is an operating system function or a function for another application;

determining, by the operating system kernel, that the function is an operating system function, wherein the operating system kernel is different from the operating system function;

in response to determining that the function is an operating system function, changing, by the operating system kernel, the access permission level of the descriptor table to a second permission level different than the first permission level;

updating, by the operating system kernel, the descriptor table while the access permission level of the descriptor table is the second permission level; and after updating the descriptor table, changing, by the operating system kernel, the access permission level of the descriptor table to the first permission level.

8. The system of claim 7, the operations further comprising:

before receiving the request to update the descriptor table, maintaining the descriptor table in a read-only state in the first permission level.

9. The system of claim 7, the operations further comprising:

initializing the descriptor table using an operating system kernel.

10. The system of claim 7, wherein setting the access permission level of the descriptor table to the first permission level comprises setting an access permission level of an interrupt descriptor table to the first permission level.

11. The system of claim 7, wherein setting the access permission level of the descriptor table to the first permission level comprises setting an access permission level of a global descriptor table to the first permission level.

12. The system of claim 7, wherein determining that the function is an operating system function comprises determining that the function is a hardware manager of the operating system.

13. A non-transitory computer storage medium encoded with a computer program, the computer program comprising instructions that when executed by a computing system cause the computing system to perform operations comprising:

setting, by an operating system kernel, an access permission level of a descriptor table to a first permission level;

receiving, from a function by the operating system kernel, a request to update the descriptor table;

in response to receiving the request to update the descriptor table, determining, by the operating system kernel, whether the function is an operating system function or a function for another application;

determining, by the operating system kernel, that the function is an operating system function, wherein the operating system kernel is different from the operating system function;

in response to determining that the function is an operating system function, changing, by the operating system kernel, the access permission level of the descriptor table to a second permission level different than the first permission level;

updating, by the operating system kernel, the descriptor table while the access permission level of the descriptor table is the second permission level; and after updating the descriptor table, changing, by the operating system kernel, the access permission level of the descriptor table to the first permission level.

14. The non-transitory computer storage medium of claim 13, further comprising:

before receiving the request to update the descriptor table, maintaining the descriptor table in a read-only state in the first permission level.

15. The non-transitory computer storage medium of claim 13, further comprising:

initializing the descriptor table using an operating system kernel.

16. The non-transitory computer storage medium of claim 13, wherein setting the access permission level of the descriptor table to the first permission level comprises setting an access permission level of an interrupt descriptor table to the first permission level.

17. The non-transitory computer storage medium of claim 13, wherein setting the access permission level of the descriptor table to the first permission level comprises setting an access permission level of a global descriptor table to the first permission level.

18. The non-transitory computer storage medium of claim 13, wherein determining that the function is an operating system function comprises determining that the function is a hardware manager of the operating system.

* * * * *